United States Patent
Kotani et al.

[11] Patent Number: 5,375,944
[45] Date of Patent: Dec. 27, 1994

[54] WASTE DISPOSING GROUND OR FACILITY

[75] Inventors: Katsumi Kotani, Tokyo; Kazuo Touge, Yachiyo; Hiroki Ogata, Kawaguchi, all of Japan

[73] Assignee: Obayashi Corporation, Osaka, Japan

[21] Appl. No.: 65,897

[22] Filed: May 25, 1993

[30] Foreign Application Priority Data

Apr. 9, 1993 [JP] Japan .................................. 5-83534

[51] Int. Cl.⁵ .............................................. B09B 1/00
[52] U.S. Cl. ....................................... 405/129; 405/55
[58] Field of Search ................ 405/53, 55, 128, 129; 71/9, 10, 14, 23

[56] References Cited
U.S. PATENT DOCUMENTS

| | | | |
|---|---|---|---|
| 3,904,524 | 9/1975 | Pelton et al. | 405/55 X |
| 4,255,389 | 3/1981 | Jung et al. | 71/9 X |
| 4,323,367 | 4/1982 | Ghosh | 405/129 X |
| 4,396,402 | 8/1983 | Ghosh | 405/129 X |
| 4,618,284 | 10/1986 | Marks | 405/129 X |
| 4,758,344 | 7/1988 | Wildenauer | 71/9 X |
| 4,844,813 | 7/1989 | Helfgott et al. | 405/129 X |
| 5,129,935 | 7/1992 | Cerroni | 71/9 |
| 5,234,596 | 8/1993 | Greeb | 71/9 X |

FOREIGN PATENT DOCUMENTS

| | | | |
|---|---|---|---|
| 204895 | 12/1986 | European Pat. Off. | 405/128 |
| 3809128 | 10/1989 | Germany | 405/129 |

*Primary Examiner*—Dennis L. Taylor
*Assistant Examiner*—John A. Ricci
*Attorney, Agent, or Firm*—Wenderoth, Lind & Ponack

[57] ABSTRACT

A waste disposing ground or facility includes a space in the form of a cavity for receiving waste therein. A planar structure covers the entire overall upper opening of the cavity. The planar structure is constructed in advance of starting disposal of waste into the cavity. Arranged on the lower surface of the planar structure is a system for spraying water on the waste. Disposed at the bottom of the cavity is a system for discharging air. Since air can be discharged from the bottom of the cavity that is closed by the planar structure, the atmosphere surrounding the waste in the cavity can be changed from an anaerobic state to an aerobic state. Since water is supplied on the waste, decomposition of organic substances which decompose under aerobic conditions can be promoted. If air is not discharged from the air discharging system, the waste is placed in an anaerobic condition, and decomposition of the organic substances which decompose under such conditions can be promoted.

8 Claims, 2 Drawing Sheets

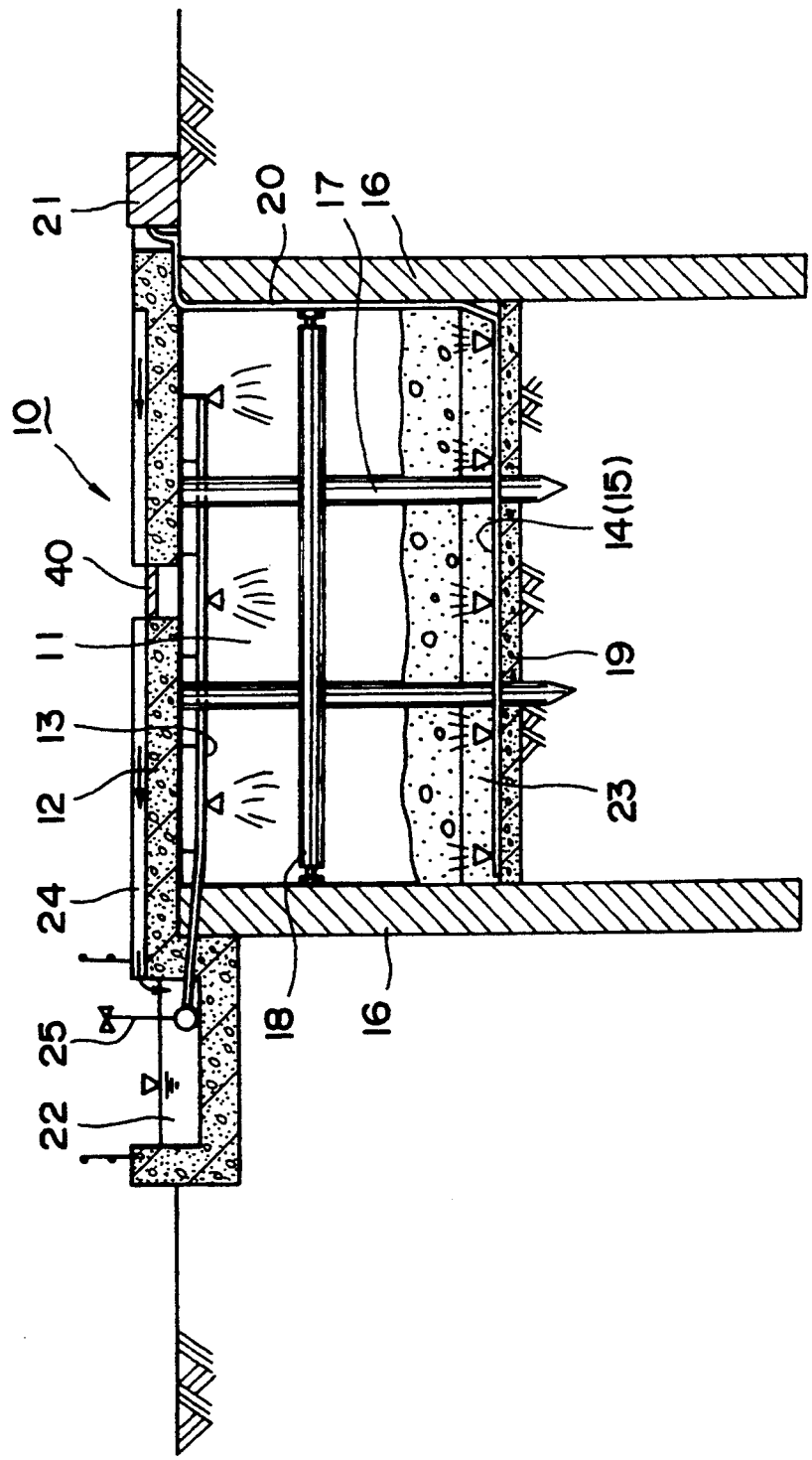

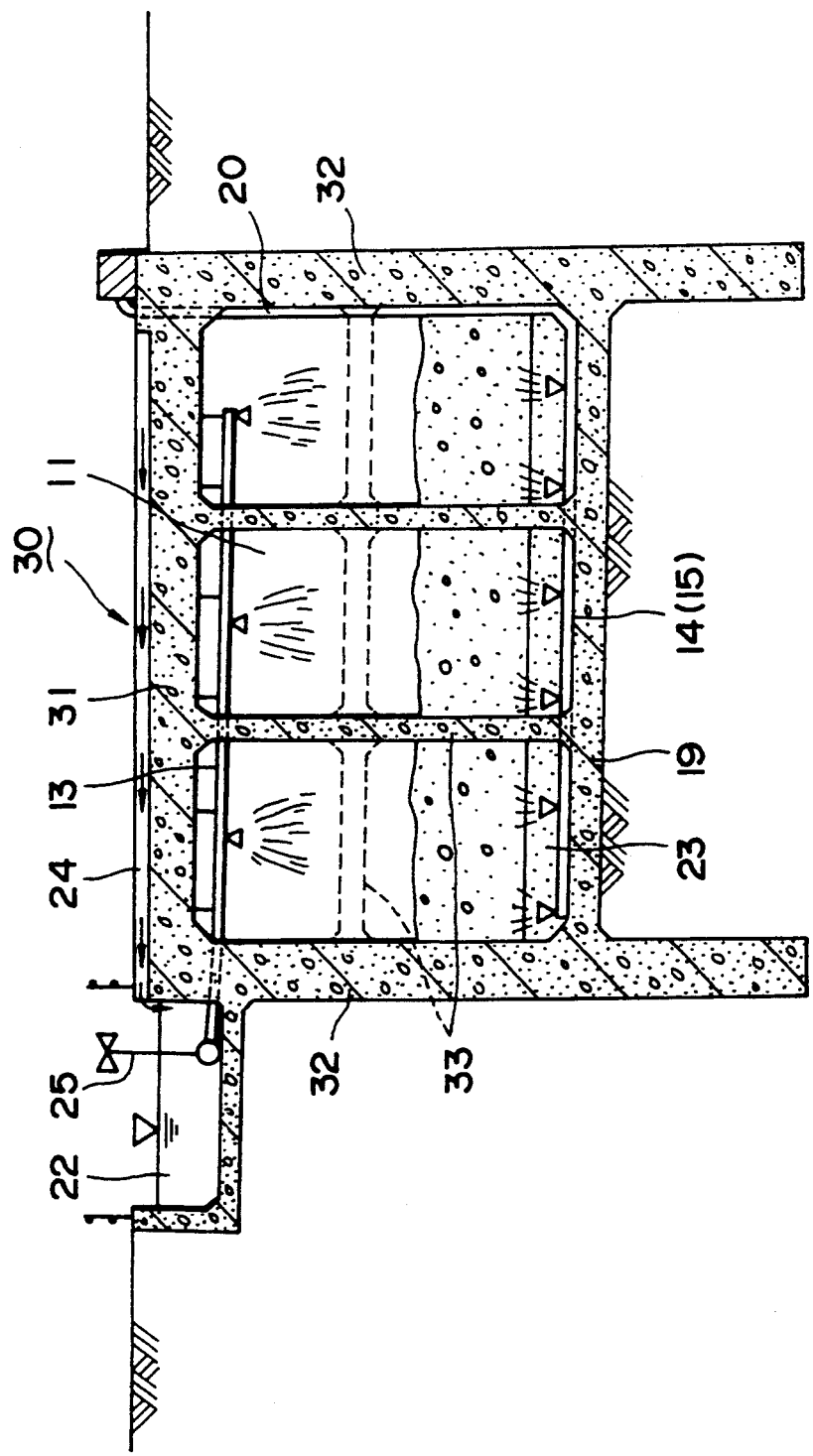

WASTE DISPOSING GROUND OR FACILITY

BACKGROUND OF THE INVENTION

1. Field of the Invention

The present invention relates generally to a waste disposing ground or facility. More specifically, the invention relates to a waste disposing ground which is effective for avoiding environmental pollution caused by accumulated waste.

2. Description of the Related Art

As is well known, industrial waste and/or commercial waste created through industrial operation and/or business operation and non-industrial waste from home life have been finally disposed by way of earth filling. Such earth filling disposal of waste is generally performed in a waste disposing ground or facility constructed in a place remote from a residential and/or industrial area, such as an inland area or a seashore area.

Such a waste disposing ground placed remote from a residential and/or industrial area, however, has the following problem. Namely, the waste generated in the residential and/or industrial area necessarily must be transported to the distant waste disposing ground.

In recent years, social interest in environmental pollution has been increasing, and therefore severe environmental assessment has been conducted before construction of waste disposing grounds. This results in difficulty in finding appropriate places for constructing waste disposing grounds. Accordingly, waste disposing grounds tend to be constructed at places more distant from residential and/or industrial districts. These circumstances make transportation of the waste from the area where the waste is generated to the waste disposing ground a labor intensive operation. As a result, cost of disposing of waste has become high. Also, there is the fear of causing environmental pollution during such transportation.

It will become possible to arrange a waste disposing ground near a residential and/or industrial area if spreading of pollutants such as insulting odor or waste water from the waste is prevented. This could result in labor saving of the waste transportation operation, and thus cost for transportation could be reduced.

SUMMARY OF THE INVENTION

The present invention has been developed in view of the current problems so forth above. Therefore, it is an object of the present invention to provide a waste disposing ground or facility which is effective for avoiding environmental pollution caused by accumulated waste and can be constructed near a residential area, etc.

In order to accomplish the above-mentioned and other objects, a waste disposing ground or facility according to one aspect of the invention comprises a space in the form of a cavity for receiving waste therein, a planar structure provided to cover the entire overall upper opening of the cavity, the planar structure being constructed in advance of starting disposal of the waste into the cavity, means arranged on a lower surface of the planar structure for spraying water on the waste, and means disposed in a bottom of the cavity for discharging air.

With a waste disposing ground or facility of such construction, since air can be discharged from the air discharging means arranged at the bottom of the cavity closed by the planar structure, the atmosphere surrounding the waste in the cavity can be changed from an anaerobic state to an aerobic state. In conjunction therewith, since water is supplied to the waste from the water spraying means, decomposition of organic substances which decompose under aerobic conditions can be promoted.

Also, if air is not discharged from the air discharging means, the waste is placed in the anaerobic condition, and decomposition of organic substances which decompose under anaerobic conditions can be promoted.

Namely, the condition in which the waste is placed can be selected between an anaerobic condition and an aerobic condition by discharging or not discharging air into the cavity. Therefore, pollutants, such as various organic substances, contained in the waste can be decomposed by both anaerobic decomposition and aerobic decomposition.

Also, by arranging the means for supplying water at the bottom of the cavity to also supply water from the lower side of the waste, the environmental conditions within the cavity can be more delicately adjusted to adapt to conditions for promoting decomposition of organic substances contained in the waste.

BRIEF DESCRIPTION OF THE DRAWINGS

The present invention will be understood more fully from the detailed description given herebelow and from the accompanying drawings of preferred embodiments of the invention, which, however, should not be taken to be limitative to the invention but for explanation and understanding only.

In the drawings:

FIG. 1 is a section of an embodiment of a waste disposing ground or facility according to the present invention; and FIG. 2 is a section of another embodiment of a waste disposing ground or facility according to the present invention.

DESCRIPTION OF THE PREFERRED EMBODIMENT

The preferred embodiments of a waste disposing ground or facility according to the present invention will be discussed hereinbelow with reference to the accompanying drawings.

One preferred embodiment of a waste disposing ground or facility 10 according to the present invention illustrated in FIG. 1 generally includes a cavity or cavity area 11 which is constructed by excavating substantially flat ground to a given depth for receiving the waste therein. An artificial ground 12 covers the entire upper opening of the cavity area 11. A water spraying facility or system 13 is provided on the lower surface of the artificial ground 12. An aeration facility or system 14 and a water supply facility or system 15 are provided at the bottom of the cavity area 11.

In order to construct the waste disposing ground 10 according to this embodiment, cut-off walls 16 are constructed as a continuous underground wall construction or by driving of steel sheet pilings, surrounding the area to form the cavity area 11, in advance of digging of the ground surface. The cut-off walls 16 serve to block entrance of underground water from lateral sides of the ground and flow of the penetrated water from the waste laterally into the ground. In conjunction therewith, the cut-off walls 16 also serve as sheathing walls for preventing the lateral side ground from degrading. It should be noted that the cut-off walls 16 preferably extend to a water impermeable layer of the ground, if such water impermeable layer is present beneath the ground where the cavity area 11 is constructed. Also, within the area surrounded by the cut-off walls 16, supporting piles 17 or supporting walls, etc. are provided for supporting the artificial ground 12 which is constructed over the cavity area 11, if necessary. It will be appreciated that it is preferred to extend the supporting piles 17 or the supporting walls to the supporting layer of the ground beneath the cavity area 11.

After completion of construction of the cut-off walls 16 and driving of the supporting piles 17, excavation of the volume surrounded by the cut-off walls 16 then is performed to thus form the cavity area 11 to be used for disposal of waste, The excavation can be performed quickly by employing an excavator, such as a clamshell, a back hoe, or the like. In addition, according to the process of excavation, intermediate timbering such as cross beams 18 may be provided so as to reinforce the cut-off walls 16 which receive soil pressure in lateral directions.

Once excavation of the cavity area 11 to the given depth is completed, a bottom floor 19 is constructed on the excavated bottom of the cavity area 11. On the bottom floor 19 as the bottom of the cavity area 11 are arranged the aeration facility 14 and water supply facility 15. The bottom floor 19 is constructed of concrete of a given thickness. The aeration facility 14 comprises a plurality of aeration pipes with air discharging nozzles arranged in the entire overall area of the bottom of the cavity area 11. Also, the water supply facility 15 comprises a plurality of water supply pipes with water discharging nozzles arranged in the entire overall area of the bottom of the cavity area 11. The aeration facility 14 and the water supply facility 15 are communicated with an air compressor 21, a water storage pool 22, etc. via air supply or water supply pipe 20 extending along a cut-off wall 16. Therefore, air and water are discharged through the aeration facility 14 and the water supply facility 15 toward waste disposed in cavity 11.

On the upper surface of the bottom floor 19 is formed a protective layer 23 for covering and protecting the aeration facility 14 and the water supply facility 15. The protective layer 23 is formed of a water and gas permeable material, such as sand, crushed stones, slag and so forth, non-woven fabric, woven fabric and so forth or appropriate laminated layers thereof. The protective layer 23 prevents the air discharging nozzles and water discharging nozzles from blocking or plugging and also prevents the aeration facility 14 and the water supply facility 15 from being damaged due to direct contact with the waste. Furthermore, a water collecting facility may be provided on the upper surface of the bottom floor 19 for collecting the water discharged by the water supply facility 15 and squeezed out of the waste.

It should be noted that though this embodiment provides that the bottom of the cavity is floor 19, such bottom floor 19 is not always necessary. For instance, when the cut-off walls 16 extend to a water impermeable layer of the ground so that only slight underground water will penetrate, the bottom floor 19 will be unnecessary. Also, in case there is no possibility of causing heaving or boiling, a water barrier sheet made of a synthetic rubber, a synthetic resin or so forth can be provided on the excavated bottom in place of the bottom floor 19. In case such a water barrier sheet is employed and when the supporting piles 17 are driven through the water barrier sheet, water cut-off rings comprising water absorptive rubber attached to the supporting piles 17 and peripheral edges of openings formed by driving the piles are co-rolled and clamped by means of concrete casted around the piles, for example, in order to prevent penetration of underground water into the cavity area 11.

On the other hand, above the cavity area 11 formed by excavation, the artificial ground 12 is formed as a flat constructional structure. The artificial ground 12 may be constructed with precast concrete panels supported on the cut-off walls 16 or on the supporting piles 17. In the alternative, the artificial ground 12 may be constructed by direct casting of the concrete at the site. The artificial ground 12 is provided at appropriate positions with one or more waste disposal openings 40 which can be opened and closed. Also, the artificial ground 12 may have a waste removal outlet which can be opened and closed as required for removal of waste converted into non-toxic waste by storage in the cavity area 11. In addition, artificial ground 12 may be provided with ventilation openings for ventilation of the interior space of the cavity area 11 and for collecting and use of methane gas or so forth generated during a process of decomposition of the waste in an anaerobic condition. It will be appreciated that the upper surface of the artificial ground 12 can be used as a local environment protective facility, such as a part or so forth.

On the lower surface of the artificial ground 12 is mounted water spraying facility or system 13 to spray water toward waste in the cavity area 11. The water spraying facility 13 includes a plurality of water spraying pipes with spray nozzles and is arranged over the entire overall area of the artificial ground 12. Each water spraying pipe is fixed onto the lower surface of the artificial ground 12 by means of a plurality of mounting members or fixtures preliminarily provided thereon. The water spraying facility 13 is designed to spray water from the water storage pool 22.

In this embodiment, the water storage pool 22 is positioned adjacent the cavity area 11 and communicates with the upper surface of the artificial ground 12 so that rain water that falls on the artificial ground 12 can be collected for storage in pool 22 via water collection grooves 24 or so forth. This makes it possible to use the rain water for spraying onto the waste in the cavity area 11. Also, a control valve 25 may be provided in the water storage pool 22 to enable control of the amount of water sprayed in the cavity area 11.

The embodiment of the waste disposing ground constructed as set forth above is capable of converting waste into non-toxic waste so as to easily prevent pollution of the environment due to propagation of the pollutant, etc. Namely, waste disposed in the cavity area 11, which is an enclosed space due to covering the upper opening with the artificial ground 12, is normally in an anaerobic state. By supplying air from below by the aeration facility 14 and by spraying water from above by the water spraying facility 13, the waste can be converted into an aerobic state. By appropriately controlling the anaerobic state and the aerobic state of the waste and by administering the amounts of air and water to be supplied, decomposition of organic substances, etc., in the waste can be controlled. Also, by controlling anaerobic decomposition and aerobic decomposition appropriately, stabilization of the organic substances can be promoted to easily convert the waste into non-toxic form. In addition, by also supplying water from the lower side of the waste, and by administering the temperature within the cavity area 11 using a solar system, etc., the condition of the waste in the cavity area appropriate for the decomposition process can be maintained, to further promote conversion of the waste into non-toxic form. Also, by unitary control of the amounts of air and water to be supplied to cavity area 11 from the aeration facility 14, the water spraying facility 13, and the water supply facility 15 and the temperature of the cavity area 11, the process of decomposition of the waste can be performed efficiently.

Also, since the volume of the waste can be reduced by decomposition and by compacting by the water, a greater amount of waste can be disposed in the cavity area 11. The waste converted into non-toxic form by the decomposition process can be removed and returned to nature, e.g. by use as a replacement for soil and sand for back filling, etc. On the other hand, by such waste removal, the waste disposing ground or facility can be used repeatedly. Furthermore, by collecting useful gas generated by decomposition of the waste, such as methane gas or so forth generated by anaerobic decomposition, such gas may be effectively used as fuel.

FIG. 2 shows a still further embodiment of a waste disposing ground or facility 30 according to the present invention. Waste disposing ground 30 is of similar construction to that of the waste disposing ground of FIG. 1, except for a supporting structure for artificial ground 31 and cut-off walls 32. Namely, artificial ground 31 and cut-off walls 32 are supported by a pillar and beam structure 33. With this construction, the artificial ground 31 and the cut-off walls 32 can be firmly and stably supported so that a large scale waste disposing ground or facility can be constructed.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within the scope encompassed and equivalents thereof with respect to the features set forth in the appended claims.

For instance, although the respective foregoing embodiments are illustrated in a construction that the cavity area 11 is surrounded by the cut-off walls 16, 32, the waste disposing ground or facility according to the present invention should not be limited to such specific constructions. For example, when a large area in a valley in a mountainous area is available, the waste disposing ground or facility can be constructed by forming the side periphery of the cavity area into a slope to the extent that break down of the ground will never be caused and by laying a water barrier sheet on such sloped surface.

We claim:

1. A waste disposal facility comprising:
   a space in the form of a cavity to receive therein waste;
   a previously constructed planar structure covering entirely an upper opening of said space;
   a plurality of water supply pipes with a plurality of water spray nozzles arranged on a lower surface of said planar structure to spray water onto waste in said space;
   a water storage pool to store water, and water supply piping between said storage pool and said water supply pipes to supply water thereto;
   a water collector on an upper surface of said planar structure to collect rain water, said water collector communicating with said storage pool so that rain water collected by said water collector is stored in said storage pool; and
   means disposed at a bottom of said space for discharging air into said space.

2. A facility as claimed in claim 1, further comprising means disposed at said bottom of said space for supplying water to waste therein from below.

3. A facility as claimed in claim 1, further comprising a control valve to control supply of water from said storage pool to said water supply pipes.

4. A facility as claimed in claim 1, wherein said air discharging means comprises a plurality of air pipes with a plurality of air discharge nozzles, and further comprising an air compressor to generate pressurized air, and air supply piping between said air compressor and said air pipes to supply pressurized air thereto.

5. A facility as claimed in claim 1, wherein said planar structure comprises a concrete panel of flat plate shape, and further comprising supporting piles driven within said space and supporting said concrete panel.

6. A facility as claimed in claim 1, wherein said planar structure comprises a concrete panel of flat plate shape, and further comprising a supporting structure of pillars and beams supporting said concrete panel.

7. A facility as claimed in claim 1, wherein said planar structure has at least one openable and closeable opening for disposal of waste into said space.

8. A waste disposal facility comprising:
   a space in the form of a cavity to receive therein waste;
   a previously constructed concrete panel of flat plate shape covering an upper opening of said space;
   a plurality of water supply pipes with a plurality of water spray nozzles;
   a water storage pool to store water and communicating with said water supply pipes to supply water thereto;
   a water collector on an upper surface of said planar structure to collect rain water, said water collector communicating with said storage pool so that rain water collected by said water collector is stored in said storage pool; and
   a plurality of air pipes with a plurality of air discharge nozzles provided at a bottom of said space, an air compressor generating pressurized air, and air supply piping between said air compressor and said air pipes to supply pressurized air thereto.

* * * * *